July 24, 1962 A. W. NORTHROP ETAL 3,045,336
REMOVAL TOOL
Filed Feb. 15, 1960 2 Sheets-Sheet 1

INVENTORS
ARTHUR W. NORTHROP
STEPHEN J. YEVCHAK
BY Donald F. Voss
ATTORNEY 3,045,336
REMOVAL TOOL

Arthur W. Northrop, Johnson City, and Stephen J. Yevchak, Binghamton, N.Y., assignors to International Business Machines Corporation, New York, N.Y., a corporation of New York Filed Feb. 15, 1960, Ser. No. 8,792
4 Claims. (Cl. 29—203)

This invention relates to apparatus for removing elements fixed relative to a member by an interference fit and solder connections and, more particularly, to apparatus for removing contact elements from a receptacle which are secured relative thereto by lances or protuberances extending from the contact elements and by solder connections.

It is quite common to construct electronic devices such as computers and other like devices from electronic modular units. The electronic modular units generally consist of pluggable elements which plug into multiposition receptacles. The pluggable elements each support electronic components electrically connected by printed circuits in the form of thin conductors adherent to the pluggable elements. This multiposition receptacle includes a body member suitably configured to contain contact elements and accept the pluggable units. The contact elements disposed within the receptacle are adapted to establish electrical contact with the terminals connecting with the printed circuits interconnecting the electronic component. The electrical connection is usually established by having the contact elements of the receptacle bear against the terminals of the pluggable element with a suitable degree of pressure. In many instances, the contact elements are coated with a precious metal such as gold to improve conductivity and to prevent corrosion.

However, in some instances the precious metal wears off and corrosion develops. Hence, the contact elements become faulty and must be replaced. The contact elements also must be replaced where they are unable to exert sufficient pressure to establish a good electrcal connection with the terminals situated upon the pluggable elements. In many instances, the contact elements are formed so that, when they are fixed within the receptacle, they develop a spring pressure. This spring pressure may decrease after extensive usage to a point where the contact elements must be replaced. Normally, it would be a relatively simple matter to replace the faulty contact elements. However, it is quite common to solder conductors to the contact elements. Hence, the removal of the faulty contact elements to permit replacement thereof requires some type of apparatus which will have the facility for removing the solder connections and forcing the contact elements from the receptacle body member.

This invention provides apparatus which melts the solder connection embracing an associated contact element. The solder is then maintained in the molten state while another member of the apparatus drives the contact element from the receptacle body. The member for driving the contact element is adapted to enter the passageway in which the contact element normally resides so as to prevent molten solder from entering therein.

Accordingly, a prime object of the invention is to provide apparatus for removing faulty contact elements from a receptacle where the contact elements are fixed relative thereto by solder connections and an interference fit.

Another object of the invention is to provide apparatus for removing contact elements held in a receptacle by solder connections and an interference fit which will melt the solder connections and prevent the molten solder from entering the channels or passageways for containing the contact elements.

Still another object of the invention is to provide apparatus for removing contact elements from a receptacle which is relatively inexpensive and easy to manufacture.

The foregoing and other objects, features and advantages of the invention will be apparent from the following more particular description of a preferred embodiment of the invention, as illustrated in the accompanying drawings.

Figure 1:
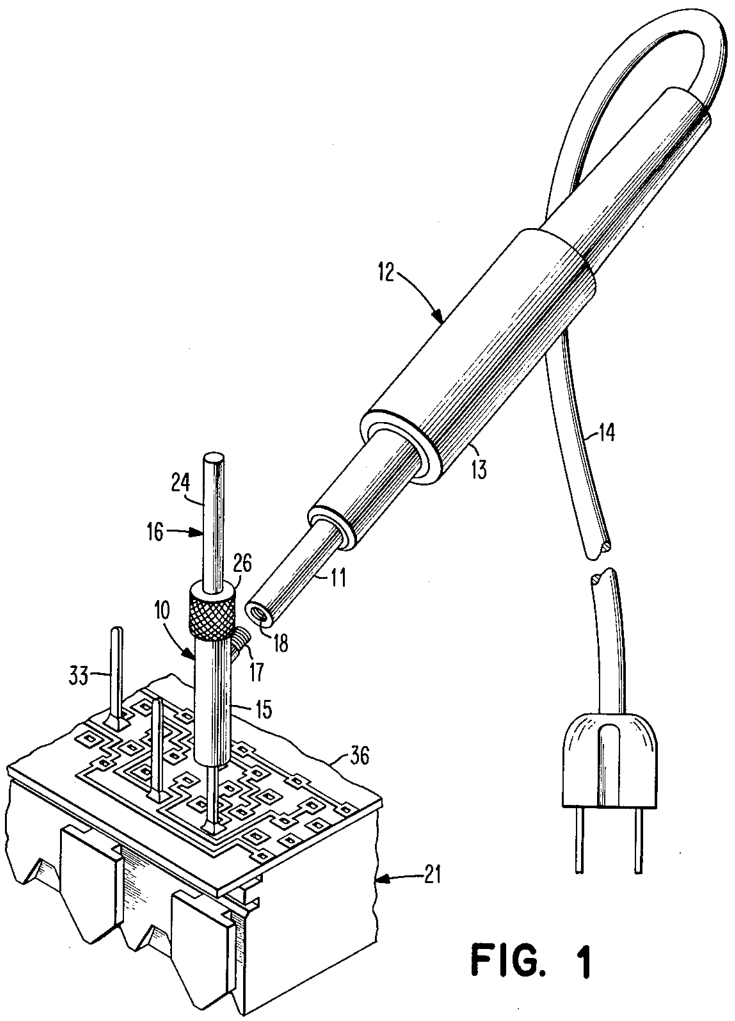
FIG. 1 is a perspective view showing the contact element removal apparatus positioned to embrace a contact element of a receptacle.
Figure 2:
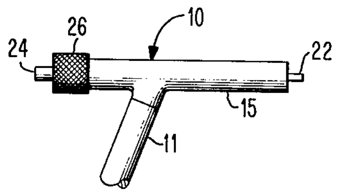
FIG. 2 is a front elevational view of the contact element removal apparatus with only a portion of the holder therefor being shown.

Referring to the drawings and particularly to FIG. 1, the contact element removal tool consists of a removal head 10 which is adapted to screw into a heating element 11 of a commercially available pencil-type soldering iron 12. The soldering iron 12 includes a handle 13 and an electrical cord 14 for conducting current to the heating element 11.

Figure 3:
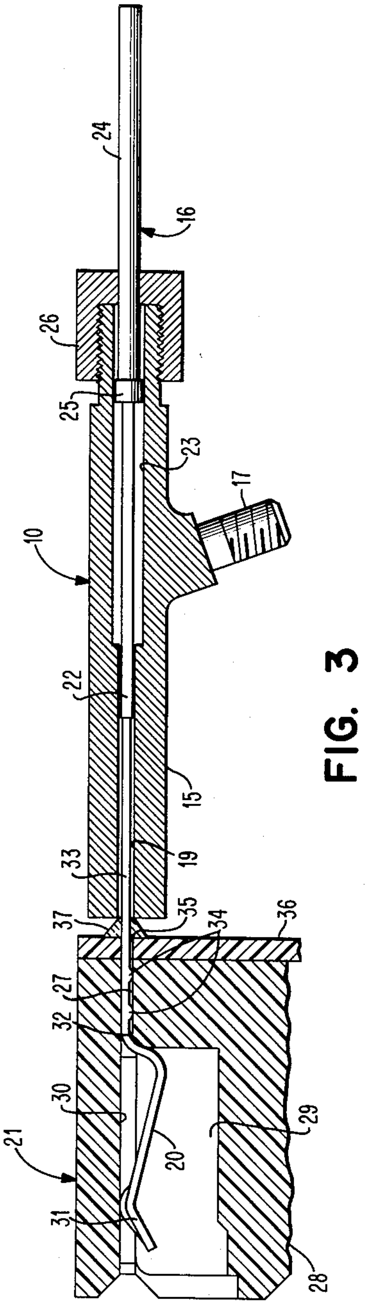
FIG. 3 is a sectional view showing the barrel of the contact element removal tool embracing a contact element of the receptacle and with the plunger for removing the contact element in its retracted position.
Figure 4:
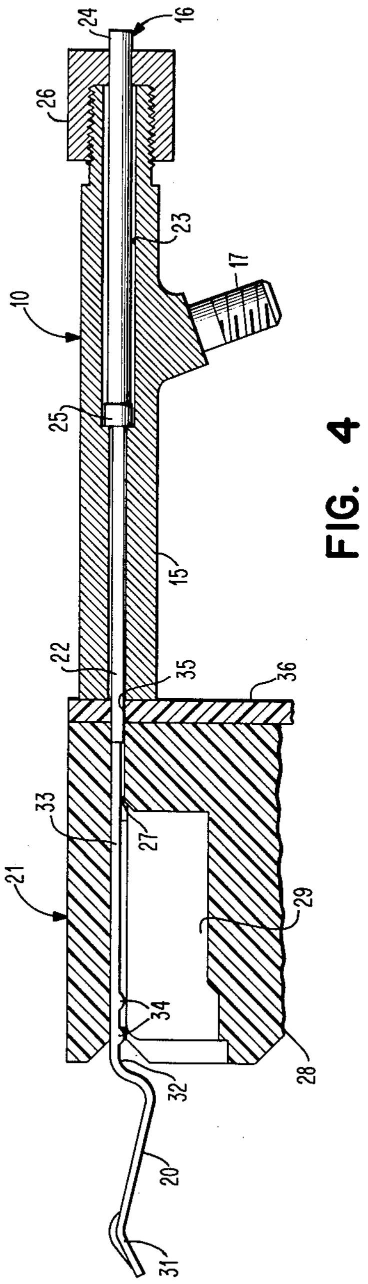
FIG. 4 is a sectional view showing the plunger of the contact element removal tool in its fully forward position and with the contact element dislodged from the receptacle.

The construction of the removal head 10 is best shown in FIGS. 3 and 4. The removal head 10 consists of a barrel 15 bored to receive a plunger 16. The barrel 15 is preferably made of copper and includes an angularly extending threaded arm 17 which is adapted to screw into an internally threaded bore 18 provided in the heating element 11, FIG. 1. By this arrangement the removal head 10 becomes heated by the heating element 11 of the soldering iron 12.

Referring back to FIGS. 3 and 4, the barrel 15 includes a forward longitudinal centrally disposed rectangular slot 19 which is adapted to embrace contact element 20 of receptacle 21 and to slidably contain a forward rectangular section 22 of the plunger 16. The slot 19 communicates with a centrally disposed open end longitudinal bore 23. The bore 23 has a diameter greater than the largest dimension of the rectangular slot 19. The bore 23 is adapted to slidably contain a cylindrical section 24 of the plunger 16. The rectangular section 22 and the cylindrical section 24 are joined to opposite ends of an enlarged cylindrical element 25. The bore 23 is of sufficient diameter to accommodate the enlarged element 25, which functions to prevent escapement of the plunger 16 from the barrel 15. The rear section of the barrel 15 is externally threaded to receive a cap 26.

The cap 26 is internally threaded so it may screw onto the end of the barrel 15. Furthermore, the cap 26 is centrally bored to permit the cylindrical section 24 to extend therethrough. However, the bore in the cap 26 will not permit the enlarged element 25 to pass therethrough. Hence, since the enlarged element 25 cannot pass through the cap 26 or the rectangular slot 19, the plunger 16 is captured within the barrel 15. However, both the forward rectangular section 22 and the rearward cylindrical section 24 may extend from the ends of the barrel 15.

Preferably, at least the rectangular section 22 of the plunger 16 is made of stainless steel or other suitable metal to which solder will not adhere. The rectangular cross-section of the member 22 should be complemental to the cross-section of the passageway 27 through which the contact elements 20 extend so that it may enter therein.

The receptacle 21 for containing the contact elements 20 is of the type shown and described in detail in the co-pending application of H. A. Johnson, Serial No. 752,038, filed July 30, 1958. However, in this example, the contact elements are not twisted 90° at the point where they emerge from the receptacle. Generally, the receptacle 21 includes a body or block 28 having partitioned cavities 29 and groove 30. The contact elements 20 consist of a contact portion 31 normally residing in the groove 30, an intermediate portion 32 leading into the passageway 27, and a terminal portion 33 extending from the block 28. The intermediate portion 32 is provided with dimple-formed protuberances 34 which bite into the block 28 upon insertion into the passageway 27. By this arrangement, the contact elements 20 are firmly anchored in the block 28. The terminal portion 33 of the contact elements 20 extends through apertures 35 provided in a panel 36. The panel 36 abuts the block 28 and is held relative thereto by a fillet of solder 37 which adheres to printed circuitry fixed on the panel, to surround the aperture 35, and to the projecting terminal portion 33. It is thus seen that the contact elements 20 are held fixed relative to the receptacle body 28 by the protuberances 34 and by the fillet of solder 37. Hence, in order to dislodge a contact element, it is first necessary to melt the fillet of solder and, while the solder is in the molten state, the contact element must be driven so that the protuberances 34 are free of the block 28.

In this invention, the barrel 15 embraces the terminal portion 33 of the contact element sufficiently so that it contacts the fillet of solder 37, as in FIG. 3. In this position, the plunger 16 is displaced rearwardly by the contact element 20 so that the cylindrical section 24 projects from the cap 26 which guides the same. The rectangular section 22 abuts the end of the contact element 20. The barrel 15 becomes heated through the facility of the heating element 11 of the soldering iron 12, FIG. 1. The heated barrel 15 melts the fillet of solder 37 and maintains the same molten. With the fillet of solder 37 melted, the contact element may be driven from the block 28 by the plunger 16. Any suitable instrument may be utilized to strike the exposed end of the cylindrical section 24 of the plunger 16 so as to displace it and the contact element 20 forward. The rectangular section 22 guided by the slot 19 acts upon the abutting end of the contact element 20 as the plunger 16 is driven forward and, when the contact element 20 is free of the block 28, the free end of the rectangular section 22 enters the aperture 35 and passageway 27 so as to prevent any solder from flowing therein. The rectangular section 22 being of stainless steel will not be affected by the molten solder.

Upon the removal of the contact element 20, the removal head may be moved to a remote position. A new contact element 20 then may be inserted and seated in position. With the new contact element in position relative to the block 28, a new solder fillet may be formed with the aid of the heated barrel 15 of the removal head 10.

From the foregoing, it is seen that a relatively inexpensive tool has been provided to remove faulty contact elements held relative to a receptacle by both solder connections and an interference fit.

While the invention has been particularly shown and described with reference to a preferred embodiment thereof, it will be understood by those skilled in the art that various changes in form and details may be made therein without departing from the spirit and scope of the invention.

What is claimed is:

1. A tool for removing electrical contact elements held relative to a receptacle by an interference fit and solder connections comprising a head member adapted to be heated by conduction to a temperature for melting the solder connections, said head member having a longitudinal slot of such dimension to permit said head to freely embrace said contact element and a longitudinal bore in line to communicate with and larger in dimension than said longitudinal slot whereby a shoulder is formed within said head at a point where said slot and bore communicate; a cap member having a bore smaller than said bore in said head member, said cap member being fixed to said head member so that the axis of the bore in the cap is in alignment with the bore in the head member; and a plunger having first, second and third sections, said first section having a cross-section substantially equal to the cross-section of the contact element and adapted to engage the end of the contact element to be removed and, upon removal of said contact element, to enter the passageway of said receptacle which had been occupied by said contact element to prevent molten solder from entering therein, said second section being larger than and connecting to the end of said first section to be slidably disposed within said bore whereby said second section is unable to enter said slot and the bore in said cap member so as to retain the plunger captive relative to the head member, said third section being smaller than and attached to said second section to extend away therefrom through the bore in said cap member.

2. A tool according to claim 1 wherein said first section consists of a material nonadherent to solder.

3. A tool according to claim 1 wherein said first section is made of stainless steel.

4. A tool for removing electrical contact elements held relative to a receptacle by an interference fit and solder connections comprising a soldering iron having a heating element provided with an internally threaded bore; a head member having a longitudinal barrel section and a male threaded arm projecting therefrom and adapted to screw into the threaded bore in said heating element whereby said longitudinal section is heated by conduction to a temperature for melting solder, said longitudinal barrel section having a first longitudinal opening of such a dimension to permit said head member to freely embrace said contact element and a second longitudinal opening communicating with and larger than said first opening to form a shoulder in said barrel section; a cap member attached to said longitudinal barrel section and having an opening smaller than and in communication with said second opening; and a plunger slidably disposed relative to said longitudinal barrel section, said plunger including a first section disposed within said first opening and adapted to project therefrom, said first section having a cross-section substantially equal to the cross-section of said contact element whereby said first section enters the passageway in said receptacle which had been previously occupied by said contact element to prevent molten solder from entering in said passageway, a second section disposed within said second opening to be held captive therewithin by said shoulder and said cap and a third section disposed within said second opening so as to extend through the opening in said cap for any position assumed by said plunger relative to said head member.

References Cited in the file of this patent

UNITED STATES PATENTS

| | | |
|---|---|---|
| 2,122,368 | Engler | June 28, 1938 |
| 2,296,087 | Burns | Sept. 15, 1942 |

FOREIGN PATENTS

| | | |
|---|---|---|
| 725,754 | France | Feb. 16, 1932 |